United States Patent [19]

Klink

[11] Patent Number: 5,603,556
[45] Date of Patent: Feb. 18, 1997

[54] RAIL CAR LOAD SENSOR

[75] Inventor: Douglas D. Klink, Weatherby Lake, Mo.

[73] Assignee: Technical Services and Marketing, Inc., Kansas City, Mo.

[21] Appl. No.: 559,630

[22] Filed: Nov. 20, 1995

[51] Int. Cl.⁶ ........................................ B60T 13/74
[52] U.S. Cl. .................. 303/22.6; 303/22.7; 303/198
[58] Field of Search .................... 303/3, 15, 20, 303/22.1–22.8, 135, 198; 188/195

[56] References Cited

U.S. PATENT DOCUMENTS

| | | | |
|---|---|---|---|
| 4,239,292 | 12/1980 | Nagase | 303/22.6 |
| 4,989,922 | 2/1991 | Pickenhahn et al. | 303/22.5 |
| 5,237,604 | 8/1993 | Ryan. | |
| 5,335,974 | 8/1994 | Klink. | |
| 5,393,129 | 2/1995 | Troiani et al. | |

*Primary Examiner*—Matthew C. Graham
*Attorney, Agent, or Firm*—Hovey, Williams, Timmons & Collins

[57] ABSTRACT

A rail car load sensor 10 configured for use with a rail car brake controller 12. The rail car load sensor 10 detects and measures the distance between rail car 14 and rail 15 and transmits a distance signal to rail car brake controller 12 for adjusting the braking action of rail car brake controller 12 in accordance with the amount of load or weight in rail car 14.

22 Claims, 1 Drawing Sheet

RAIL CAR LOAD SENSOR

BACKGROUND OF THE INVENTION

1. Field of the Invention

The present invention relates to rail car braking systems, and more particularly to a rail car load sensor configured for use with a rail car brake controller. The rail car load sensor adjusts the braking force applied by the rail car brake controller in accordance with the amount of load or weight in the rail car for optimally stopping or braking the rail car in the least amount of distance while eliminating wheel sliding.

2. Description of the Prior Art

Rail car braking systems generally include pneumatically operated brake cylinders, control valves for directing air to the brake cylinders, a main valve located in the train locomotive for controlling the operation of the control valves, and distribution piping connecting the brake cylinders and valves to an air source. An engineer operates the rail car brakes by activating the main valve, which causes a pressure drop in the distribution piping. This pressure drop signals the control valves to distribute air to the brake cylinders for braking the rail cars.

A serious problem with conventional rail car brake systems is wheel sliding caused by excessive braking force applied to an empty rail car. Due to the recent use of lightweight materials for rail cars, the empty weight of a rail car is significantly lighter than the loaded weight of the rail car. Thus, if the rail car brake system is designed to stop the rail car when it is loaded, it applies too much braking force to the rail car wheels when the rail car is empty, thus causing wheel sliding. Conversely, if the rail car brake system is designed to stop the rail car when it is empty, it will not provide sufficient braking force to stop the rail car when the rail car is loaded. Damaged wheels due to wheel sliding is the largest single maintenance cost for many rail car owners.

In response to these problems, one prior art solution involves the use of "loaded/empty" sensors coupled with the rail cars' suspension systems. A loaded/empty sensor operates on the principle that a loaded rail car will have a shorter distance from the car body to the unsprung portion of the rail car suspension than will an empty car.

Prior art loaded/empty sensors include a lever positioned on the springs of the rail car suspension and a lever-operated valve coupled with the rail car's brake cylinders. The lever moves when the rail car's springs compress or expand in response to changes in the amount of weight or load in the rail car. When the lever moves upwards a predetermined amount, it operates the valve, thus diverting some of the air intended for the brake cylinder into an air reservoir. This reduces the air pressure delivered to the brake cylinder, thus reducing the braking force of the brake system.

Although prior art loaded/empty sensors partially reduce wheel sliding, they suffer from several limitations that limit their effectiveness in many applications. For example, prior art loaded/empty sensors merely sense whether the car is completely loaded or completely empty, but do not sense intermediate ranges such as when the rail car is partially loaded or partially empty. Thus, these prior art loaded/empty sensors cannot accurately measure a full range of rail car weight and thus cannot optimally control the rail car brakes for both braking the rail car in the least amount of distance while also eliminating wheel sliding.

Another problem with prior art loaded/empty sensors is that they cannot be easily adjusted to compensate for changing brake system conditions such as system air pressure and temperature. Additionally, since prior art loaded/empty sensors utilize mechanical levers and switches, they are subject to wear, freezing, and contact failure.

Accordingly, there is a need for an improved rail car brake system that overcomes the limitations of the prior art. More particularly, there is a need for an improved rail car load sensor that optimally stops or brakes the rail car in the least amount of distance while eliminating wheel sliding.

SUMMARY OF THE INVENTION

The rail car load sensor of the present invention solves the prior art problems discussed above and provides a distinct advance in the state of rail car brake systems. More particularly, the rail car load sensor provides for the optimal amount of braking force for stopping or braking the rail car in the least amount of distance while eliminating wheel sliding.

The preferred rail car load sensor of the present invention is configured for use with a rail car brake controller that is operable for controlling the brakes of a rail car traveling on a rail. The rail car brake controller broadly includes a pneumatic valve for directing air to the rail car brake cylinders and a controller for controlling the position of the valve for controlling the amount of air delivered to the brake cylinders.

The rail car load sensor monitors or measures the amount of load or weight in the rail car and adjusts the braking action of the rail car brake controller in accordance with this measured load or weight. The preferred rail car load sensor broadly includes a distance sensor and a controller.

The distance sensor is preferably positioned under the rail car and is operable for sensing the distance between the rail car and a stationary position under the rail car such as the rail. The controller is responsive to the distance sensor for generating and transmitting distance signals representative of the distance between the rail car and the rail to the rail car brake controller. Those skilled in the art will appreciate that the distance signals transmitted to the rail car brake controller are representative of the amount of load in the rail car. The rail car brake controller analyzes the distance signals for adjusting the braking force exerted by the brake system in accordance with the amount of weight or load in the rail car.

By constructing a rail car load sensor as described above, numerous advantages are realized. For example, the rail car load sensor of the present invention is operable for sensing any distance between the rail car and the rail. Thus, the rail car load sensor can adjust the braking force of the rail car brake system in response to small changes in the loading of the rail car. This allows the rail car brake controller to provide the optimal braking force to the brake cylinders for stopping or braking the rail car in the least amount of distance while eliminating wheel sliding.

Additionally, the rail car load sensor of the present invention can also detect train derailments. If the distance sensor senses that the distance between the rail car and the rail changes rapidly or goes outside of an acceptable range (e.g., it drops below a certain distance), the controller can generate an alarm signal for indicating a probable derailment.

Another advantage of the present invention is that each load sensor controller can be programmed to maintain a history of the loaded and empty cycles and the normal loaded and empty limits for its respective rail car. This information can then be used to adjust the braking force of the rail car as the rail car suspension springs' compressive strength changes due to age. Additionally, since the rail car load sensor is electronic, the braking force exerted by the rail car brake system controller can be easily modified without mechanical readjustments.

BRIEF DESCRIPTION OF THE DRAWING FIGURES

A preferred embodiment of the present invention is described in detail below with reference to the attached drawing figures, wherein:

FIG. 1 is a schematic view of a railroad car showing the load sensor of the present invention coupled with a rail car brake controller; and FIG. 2 is a block diagram of the load sensor and rail car brake controller of the present invention.

DETAILED DESCRIPTION OF THE PREFERRED EMBODIMENTS

Figure 1:
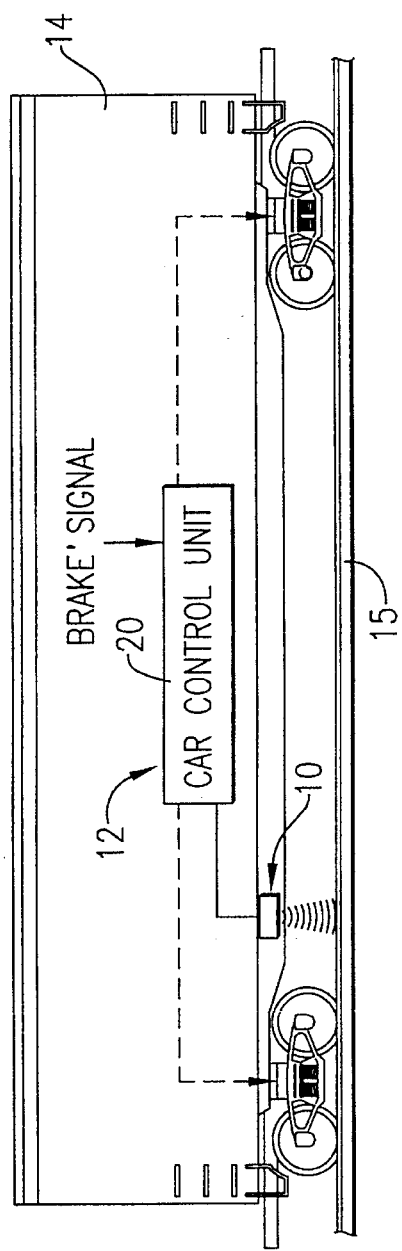

FIG. 1 illustrates preferred rail car load sensor 10 shown coupled with rail car brake controller 12 on rail car 14 riding on rail 15. As described in more detail below, rail car brake controller 12 controls rail car's 14 brakes and rail car load sensor 10 monitors or measures the amount of load or weight in rail car 14 and adjusts the operation of rail car brake controller 12 in accordance with this measured load or weight.

In more detail, rail car brake controller 12 is preferably an electronic brake system controller such as the Model No. P.N. 081-50101 controller manufactured by Technical Service and Marketing, Inc. This type of controller is described in detail in U.S. Pat. No. 5,335,974 (the '974 patent), hereby incorporated by reference.

Figure 2:
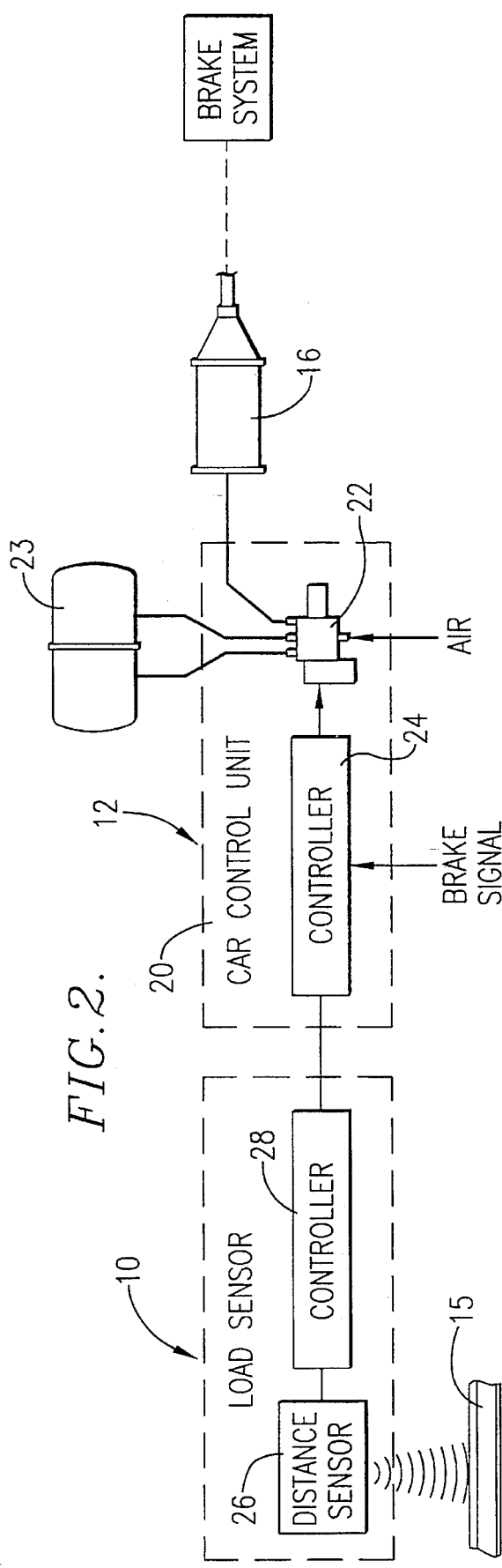

As illustrated in FIG. 2, rail car brake controller 12 is operable for controlling the brakes of rail car 14 traveling on rail 15 by controlling the amount of air delivered to the rail car's pneumatically operated brake cylinders 16. Rail car brake controller 12 generally includes a head end unit (not shown) and at least one car control unit 20.

The head end unit is typically positioned in the locomotive of the train and is provided for initiating braking action of the train's rail cars 14. The head end unit includes entry buttons or keys and associated control circuitry for receiving braking commands from an engineer and for transmitting brake signal to car control units 20 via conventional electrical control cabling.

Car control unit 20 receives the brakes signals from the head end unit and controls or activates the brake cylinders 16 of the rail car 14 in response to these brake signals. A separate car control unit 20 is preferably mounted in each rail car 14 of the train.

As illustrated in FIG. 2, car control unit 20 broadly includes at least one pneumatic valve 22 and controller 24. Valve 22 is coupled with a source of pressurized air and air reservoir tank 23. Valve 22 and its corresponding pneumatic supply are provided for directing air to rail car's 14 brake cylinders 16.

Controller 24 is coupled with valve 22 for controlling the position of valve 22 for controlling the amount of air delivered to brake cylinders 16 in response to the brake signals transmitted from the head end unit. Each car control unit 20 also includes other control electronics, pneumatic valves and air pressure sensors described in detail in the '974 patent referenced above.

Rail car load sensor 10 monitors or measures the amount of load or weight in rail car 14 and adjusts the operation of rail car brake controller 12 in accordance with this measured load or weight. As illustrated in FIG. 2, the preferred rail car load sensor broadly includes height or distance sensor 26 and controller 28.

Distance sensor 26 is preferably mounted underneath rail car 14 and senses the distance between rail car 14 and rail 15 for determining the amount of weight or load in rail car 14. Those skilled in the art will appreciate that the distance between rail car 14 and rail 15 is representative of or proportional to the amount of load or weight in rail car 14.

Distance sensor 26 includes a signal generator for generating and directing a pulse or signal towards the rail and a receiver for receiving a reflected signal as it is reflected from rail 15. Distance sensor 26 is preferably an ultrasonic type device but may also include other types of position or distance sensors including optical sensors, acoustic sensors, or radar sensors.

Controller 28 is coupled with controller 24 and responsive to distance sensor 26 for generating and transmitting distance signals to controller 24. Controller 28 monitors distance sensor 26 and measures the time interval between the generation of the sensor signals and the receipt of the reflected signals from the rail. Controller 28 converts the measured time interval to a distance signal representative of the distance between rail car 14 and the rail. Controller 28 then transmits these distance signals to car control unit controller 24.

Controller 28 is preferably a programmable microprocessor but may also include other conventional electronic control devices operable for monitoring distance sensor 26 and transmitting distance signals to car control unit 20. In preferred forms, controller 28 may be programmed to maintain a history of the loaded and empty cycles and the normal loaded and empty limits for its respective rail car 14. This information can then be used to adjust the braking force applied by car control unit 20 as the rail car suspension springs' compressive strength changes due to age. Additionally, the braking force exerted by the rail car brake system controller 12 can also be easily modified without requiring mechanical readjustments.

Controller 28 may also be programmed to detect train derailments. For example, controller 28 may be programmed so that when distance sensor 26 senses that the distance between rail car 14 and the rail changes rapidly or goes outside of an acceptable range (e.g., it drops below a certain distance), controller 28 generates an alarm signal for indicating a probable derailment. This alarm signal may be sent to head end unit 18 or may be transmitted to conventional alarm lights and/or horns.

In operation, an engineer initiates rail car 14 braking by activating the appropriate control on the head end unit of rail car brake controller 12. The head end unit translates the engineer's request for a brake application into a target brake cylinder pressure and transmits this target brake cylinder pressure to each car control unit 20 in the train. Each car control unit 20 receives the target brake control pressure and applies the appropriate amount of pressure to its respective brake cylinders 16.

Each rail car load sensor 10 continually monitors or measures the amount of load or weight in its rail car 14 and provides an input signal to car control unit controller 24 for adjusting the braking action of the rail car brake cylinders 16 in accordance with this measured load or weight. Car control unit 20 receives the distance signals, which are representative of or proportional to the amount of load or weight in rail car 14, and adjusts the braking force by adjusting the amount of air delivered to the rail car's brake cylinders 16 in accordance with the amount of weight in rail car 14.

For example, if load sensor 10 determines or measures that rail car 14 is empty, it transmits a distance signal to car control unit 20 that lessens or reduces the braking force called for by controller 24. Conversely, if load sensor 10 determines or measures that rail car 14 is full, it transmits a distance signal to car control unit 20 that increases the braking force called for by controller 24. This allows car control unit 20 to optimally stop or brake rail car 14 in the least amount of distance while eliminating wheel sliding. Additionally, since load sensor 10 can measure any distance between rail car 14 and rail 15, the braking force can be adjusted over an infinite range for optimally braking rail car 14 while eliminating wheel sliding.

Although the invention has been described with reference to the preferred embodiment illustrated in the attached drawing figures, it is noted that equivalents may be employed and substitutions made herein without departing from the scope of the invention as recited in the claims. For example, although rail car load sensor 10 preferably measures the distance between rail car 14 and rail 15, it may also measure other distances representative of the weight or load in rail car 14 such as the distance between rail car 14 and the ground or the distance between rail car 14 and a position on the rail car's suspension system.

Having thus described the preferred embodiment of the invention, what is claimed as new and desired to be protected by Letters Patent includes the following:

1. In a rail car brake controller operable for controlling the brakes of a rail car traveling on a rail, a rail car load sensor for adjusting the operation of the rail car brake controller in accordance with the amount of load in the rail car, said rail car load sensor comprising:

sensor means for sensing the distance between the rail car and the rail; and control means coupled with the rail car brake controller and responsive to said sensor means for generating and transmitting distance signals representative of the distance between the rail car and the rail to said rail car brake controller for adjusting the braking force of the rail car in accordance with said distance signals.

2. The rail car load sensor as set forth in claim 1, wherein said distance signals are representative of the amount of load in the rail car.

3. The rail car load sensor as set forth in claim 1, said sensor means including generating means for generating and directing a signal towards the rail and receiving means for receiving a reflected signal from the rail.

4. The rail car load sensor as set forth in claim 3, said control means including measuring means for measuring the time interval between the generation of said signal by said generating means and the receipt of said reflected signal by said receiving means, converting means for converting said measured time interval to a distance signal representative of the distance between said rail car and the rail, and transmitting means for transmitting said distance signal to said rail car brake controller for adjusting the operation of said rail car brake controller in accordance with said distance signal.

5. The rail car load sensor as set forth in claim 4, said sensor means including an ultrasonic distance detector operable for generating and receiving ultrasonic energy.

6. The rail car load sensor as set forth in claim 4, said sensor means including an optical distance detector operable for generating and receiving optical signals.

7. The rail car load sensor as set forth in claim 4, said sensor means including an acoustic distance detector operable for generating and receiving acoustic signals.

8. The rail car load sensor as set forth in claim 4, said sensor means including a radar distance detector operable for generating and receiving radar signals.

9. The rail car load sensor as set forth in claim 4, said control means including a microprocessor.

10. The rail car load sensor as set forth in claim 1, said transmitting means including a communication link between said load sensor and said rail car brake controller.

11. In a rail car brake controller operable for controlling the brakes of a rail car traveling on a rail, a rail car load sensor for adjusting the operation of the rail car brake controller in accordance with the amount of load in the rail car, said rail car load sensor comprising:

a distance sensor for sensing the distance between the rail car and the rail, the distance being representative of the amount of load in the rail car, said distance sensor including generating means for generating and directing a signal towards the rail, and receiving means for receiving a reflected signal from the rail; and a microprocessor coupled with said distance sensor and said rail car brake controller, said microprocessor including measuring means for measuring the time interval between the generation of said signal by said generating means and the receipt of said reflected signal by said receiving means, converting means for converting said measured time interval to a distance signal representative of the distance between said rail car and the rail, said distance signal being representative of the amount of load in the rail car, and transmitting means for transmitting said distance signal to said rail car brake controller for adjusting the operation of said rail car brake controller in accordance with said distance signal.

12. The rail car load sensor as set forth in claim 1, said transmitting means including a communication link between said load sensor and said rail car brake controller.

13. A rail car brake system for braking a rail car traveling on a rail, said rail car brake system comprising:

a load sensor for measuring the amount of load in the rail car, said load sensor including sensor means for sensing the distance between the rail car and the rail; and control means coupled with said rail car brake controller and responsive to said sensor means for generating and transmitting distance signals representative of the distance between the rail car and the rail to said rail car brake controller for adjusting the braking force of the rail car in accordance with said distance signals; and a rail car brake controller coupled with said load sensor and operable for controlling the brakes of the rail car, said rail car controller including a pneumatic valve for directing air to the rail car brakes and controlling means coupled with said control means for receiving said distance signal and for controlling the position of said valve for controlling the amount of air directed to the rail car brakes.

14. The rail car load sensor as set forth in claim 13, wherein said distance signals are representative of the amount of load in the rail car.

15. The rail car brake system as set forth in claim 13, said sensor means including generating means for generating and directing a signal towards the rail and receiving means for receiving a reflected signal from the rail.

16. The rail car brake system as set forth in claim 15, said control means including measuring means for measuring the time interval between the generation of said signal by said generating means and the receipt of said reflected signal by said receiving means, converting means for converting said measured time interval to a distance signal representative of the distance between said rail car and the rail, and transmitting means for transmitting said distance signal to said rail car brake controller for adjusting the operation of said rail car brake controller in accordance with said distance signal.

17. The rail car brake system as set forth in claim 15, said sensor means including an ultrasonic distance detector operable for generating and receiving ultrasonic energy.

18. The rail car brake system as set forth in claim 15, said sensor means including an optical distance detector operable for generating and receiving optical signals.

19. The rail car brake system as set forth in claim 15, said sensor means including an acoustic distance detector operable for generating and receiving acoustic signals.

20. The rail car brake system as set forth in claim 15, said sensor means including a radar distance detector operable for generating and receiving radar signals.

21. The rail car brake system as set forth in claim 15, said control means including a microprocessor.

22. The rail car load sensor as set forth in claim 15, said transmitting means including a communication link between said load sensor and said rail car brake controller.

\* \* \* \* \*